United States Patent [19]

St. Clair

[11] 4,067,354
[45] Jan. 10, 1978

[54] GAS PRESSURE REGULATOR HAVING HIGH AND LOW PRESSURE SHUTOFF MEANS

[75] Inventor: Theodore A. St. Clair, Fairfield, Conn.

[73] Assignee: Textron Inc., Providence, R.I.

[21] Appl. No.: 706,571

[22] Filed: July 19, 1976

[51] Int. Cl.² ............................................. F16K 43/00
[52] U.S. Cl. ................................. 137/329.4; 137/458; 137/613; 137/454.5
[58] Field of Search ..................... 137/613, 458, 329.2, 137/329.4, 454.7

[56] References Cited

U.S. PATENT DOCUMENTS

| | | | |
|---|---|---|---|
| 3,809,108 | 5/1974 | Hughes | 137/505.47 X |
| 3,971,410 | 7/1976 | St. Clair | 137/613 |

Primary Examiner—Harold W. Weakley
Attorney, Agent, or Firm—Arthur A. Johnson

[57] ABSTRACT

There is disclosed herein a gas pressure regulator having valve means for stopping the flow of gas downstream through the regulator when the pressure of the incoming gas is higher or lower than predetermined acceptable values even though acceptable pressure is subsequently restored, and manually operated means for resetting the valve means after it is determined that the pressure of the gas flowing to the inlet of the regulator has returned to said predetermined acceptable values, provision being made for maintaining a high pressure shutoff valve closed even though pressure of gas in the regulator returns to acceptable pressure by manually operable means not accessible to inexperienced persons.

5 Claims, 8 Drawing Figures

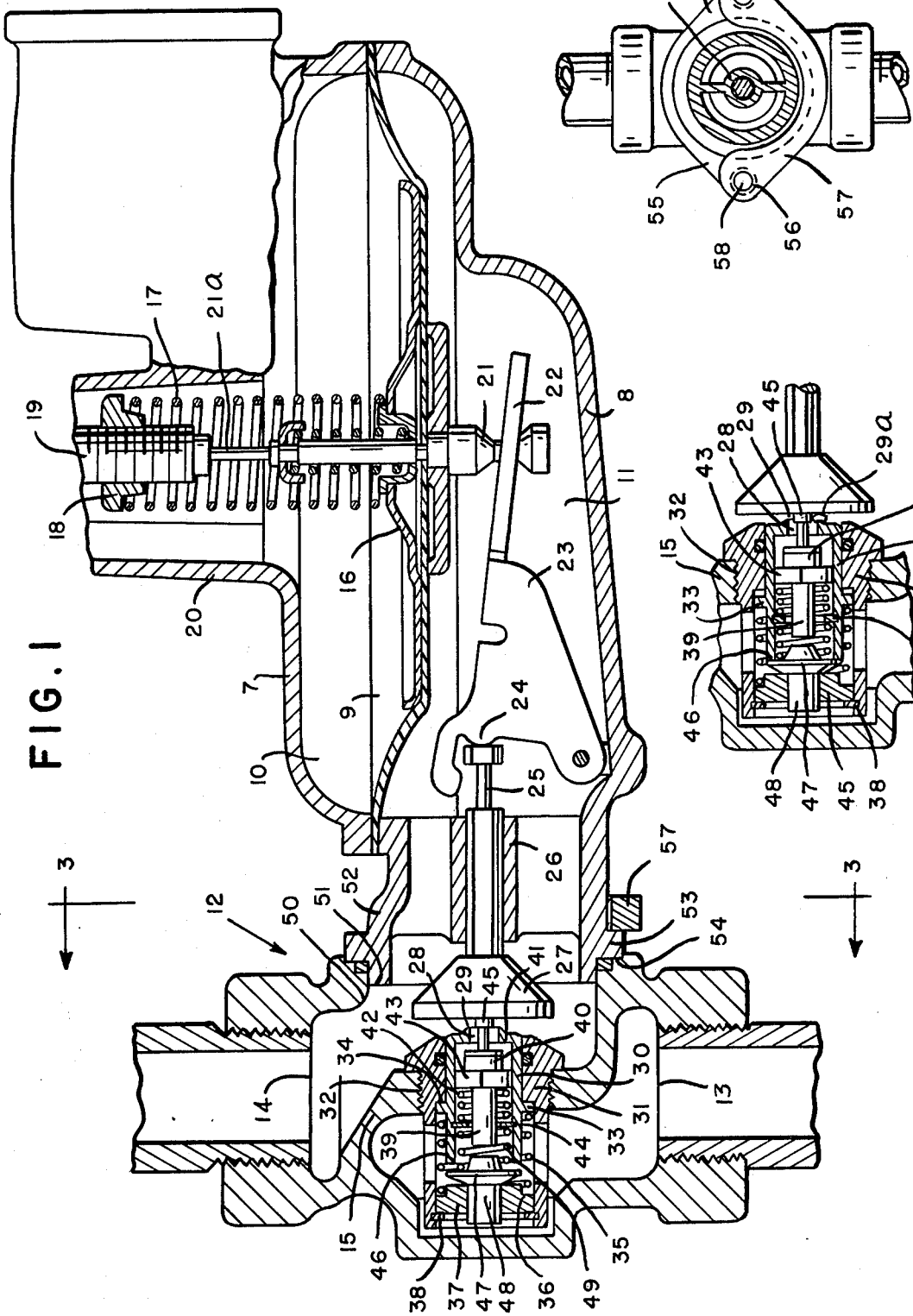

GAS PRESSURE REGULATOR HAVING HIGH AND LOW PRESSURE SHUTOFF MEANS

This invention relates to safety means for gas pressure regulators such as service regulators which supply fuel gas to utility customers. In the functioning of such regulators, there are potential hazards (even though rare) resulting particularly from excessive pressure and excessive underpressure conditions.

When an excessive underpressure condition exists, such as gas pressure failure, the pressure regulating valve of the regulator normally would be moved to wide open position and so remain until the pressure increases to an acceptable value. However, in the meantime, due to the excessive low pressure, any burners or pilot lights in use and not equipped with thermal safety shutoff valves, or in the case of malfunctioning thermal shutoff valves, gas will escape and accumulate in the atmosphere and create extremely hazardous explosive and asphyxiating conditions.

An object of this invention is to provide, in a service gas regulator having a single diaphragm, improved means for guarding against the hazardous conditions that result from excessively low pressure gas.

An important feature of this invention is the provision of improved safety valve means which completely shuts off the flow of gas from the inlet port of the regulator to the outlet port thereof when the pressure of the gas drops below a predetermined value and remains in shutoff condition, even after acceptable pressure conditions are restored, with the provision of means whereby the regulator may not be reactivated, after it has been shut off because of excessive low pressure conditions, except by a person possessed of tools and the knowledge of how and where to use them, after having checked all the burners and other gas outlets to determine that they all are closed.

Another feature is the provision of improved means in such a shutoff valve mechanism whereby the flow of gas to the regulator may be monitored and ultimately shut off, even if for any reason the main regulator valve fails to function, for instance when a foreign substance is interposed between the main valve and the orifice with which it cooperates.

Another feature is the provision of a safety valve for gas regulators in which, when the diaphragm casing is removed from the valve housing to give access to the valve unit or for any other reason, as soon as the main diaphragm valve is moved away from the valve unit, the downstream shutoff valve will engage the valve seat on the orifice sleeve and block the flow of gas from the orifice. In the event that the valve unit was locked up due to excessively high pressure, the upstream shutoff valve will also prevent the escape of gas from the orifice sleeve when the diaphragm casing is removed from the valve housing.

Other features and advantages will hereinafter appear.

In the accompanying drawings:

FIG. 1 is a vertical sectional view showing a regulator in normal pressure monitoring condition and showing the shutoff and control valves of the present invention installed in the dividing wall of the valve housing.

FIG. 2 is a sectional view of the valve unit of the present invention showing the position of the parts when a particle of foreign matter is lodged between the main valve seat and its orifice.

FIG. 3 is a sectional view taken on the line 3—3 of FIG. 1 showing the means for holding the diaphragm casing to the valve housing.

Figure 4:
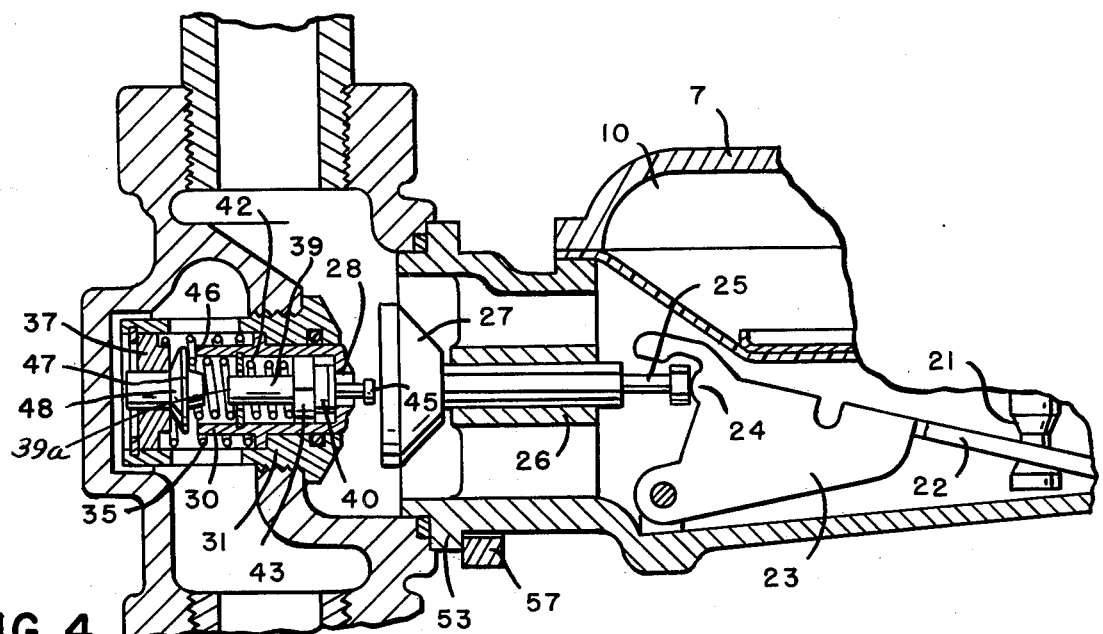
FIG. 4 is a vertical section of a portion of the regulator showing the movable parts of the pressure control and shutoff valves in the positions they occupy under excessively low pressure conditions.

As shown in the accompanying drawings, the regulator to which the present invention is applied, as illustrative thereof, has a diaphragm case comprising an upper housing 7 and a lower housing 8 between which there is clamped a diaphragm 9 forming an atmospheric air chamber 10 and a gas chamber 11. The regulator has a valve housing 12 having an inlet port 13 and an outlet port 14 separated by a dividing wall 15. A plate 16 on the diaphragm 9 is engaged by a coil spring 17 which yieldably urges the diaphragm 9 to its lowermost position. The upper end of the spring 17 engages a nut 18 on a screw 19 mounted in a housing 20 to adjust the force exerted by the spring 17.

Operating means 21 secured to the diaphragm 9 engages the end portion 22 of a bellcrank 23 which engages one end 24 of a valve stem 25 which is slidably mounted for axial movement in a bearing 26 in the throat portion of the lower housing 8 of the regulator. The other end of the valve stem 25 carries a main valve 27 which is moved by the bellcrank 23 closer to or farther from an orifice 28 when moved by the diaphragm 9 acted on by opposing forces, one from gas pressure on the gas side of the diaphragm 9, and the other from the force of the spring 17 on the atmosphere side of the diaphragm respectively.

As in U.S. Pat. Nos. 3,613,725; 3,742,972; 3,754,570, 3,809,108, 3,971,410 and in my copending application Ser. No. 680,584, filed Apr. 26, 1976, and my copending application Ser. No. 555,547, filed Mar. 5, 1975, now Pat. No. 3,971,410, granted July 27, 1976, the orifice 28 is at the downstream end of an orifice sleeve 30 which is slidably mounted in a bushing 31 secured by screw threads 32 in the dividing wall 15. The orifice sleeve 30 has a flange 33 positioned to engage a shoulder 34 on the bushing 31 under the force of a spring 35 interposed between a flange 33 and s shoulder 36 on a plug 37 mounted in the inner end of the bushing 31 and retained therein by a snap ring 38 which engages the end of the plug 37.

In the normal operaton of the regulator the main valve 27, under the influence of the diaphragm 9, advances toward and recedes from the valve seat 29 to allow less or more gas to pass between the inlet 13 and the outlet 14 of the regulator to compensate for normal variations in the pressure of the gas flowing through the system. Howeve, there are rare, but ever possible, occasions when the pressure of the gas entering the regulator decreases beyond acceptable safe limits and produces potentially hazardous situations with possible serious results as pointed out above.

When for any cause the pressure of the gas in the regulator drops below a predetermined range of pressure, as in a conventional regulator, the diaphragm 9 would descend, as shown in FIG. 4, under the force of the regulator spring 17 and cause the main valve 27 to move away from the valve seat 29 and, unless otherwise prevented, allow gas to freely flow into the diaphragm chamber 11 and through the outlet 13 to equipment being supplied with gas.

Normally under excessively low pressure conditions the flames of any operating burners or pilot lights would die out. After this happens, if the pressure comes back on the line, gas from any open burners or pilot lights which are not equipped with thermal shutoff valves (or in case any such valves are not functioning), will discharge into the environment with the attendant danger of causing an explosion or possibly asphyxiating persons in the vicinity.

To avoid such hazards, there is provided (see FIG. 1) in the orifice sleeve 30 a shutoff valve body 39 which has a low pressure shutoff valve 40 adapted to engage an upstream valve seat 41 of the orifice sleeve 30 under the influence of a spring 42 which extends between an hexagonal guide block 43 forming part of the shutoff valve body 39 and a snap ring 44, see FIG. 4.

A pin 45 on the shutoff valve body 39 normally extends through and outwardly beyond the orifice 28, as shown in FIG. 1, in which the movable parts are shown in normal pressure-regulating positions with the pin 45 engaging the main valve 27 and the outer edge portion of the shutoff valve 40 spaced from the upstream valve seat 41 of the orifice 28. In this position, the gas flows through the open end of orifice sleeve 30 past the snap ring 44 and guide block 43, then between the safety valve 40 and upstream valve seat 41 of the orifice, through the orifice 28 between the downstream valve seat 29 and the main valve 27 into outlet 13 and joining the gas in the diaphragm gas chamber 11.

In the normal operation of the regulator the shutoff valve body 39 reciprocates in the orifice sleeve 30 in response to the normal movement of the main valve 27 and does not control the amount of gas flowing through the regulator. However, if the pressure of the gas entering the regulator decreases below the lower limit of acceptable pressures, the bellcrank 23 will move clockwise and the main valve 27 will recede from the valve seat 29, as shown in FIG. 4, allowing the pin 45 and safety valve body 39 under the force of the spring 42, to move the shutoff valve 40 against the upstream valve seat 41 of the orifice sleeve 30 and shut off the flow of gas through the orifice 28 to the outlet 13 of the regulator.

When safe gas pressure is restored in the inlet 12, the regulator will remain locked up as shown in FIG. 4 because the gas flowing into orifice 28 would impinge upon the guide block 43 and the valve 40 and hold the latter firmly against the upstream valve seat 41 of the orifice 28.

Figure 8:
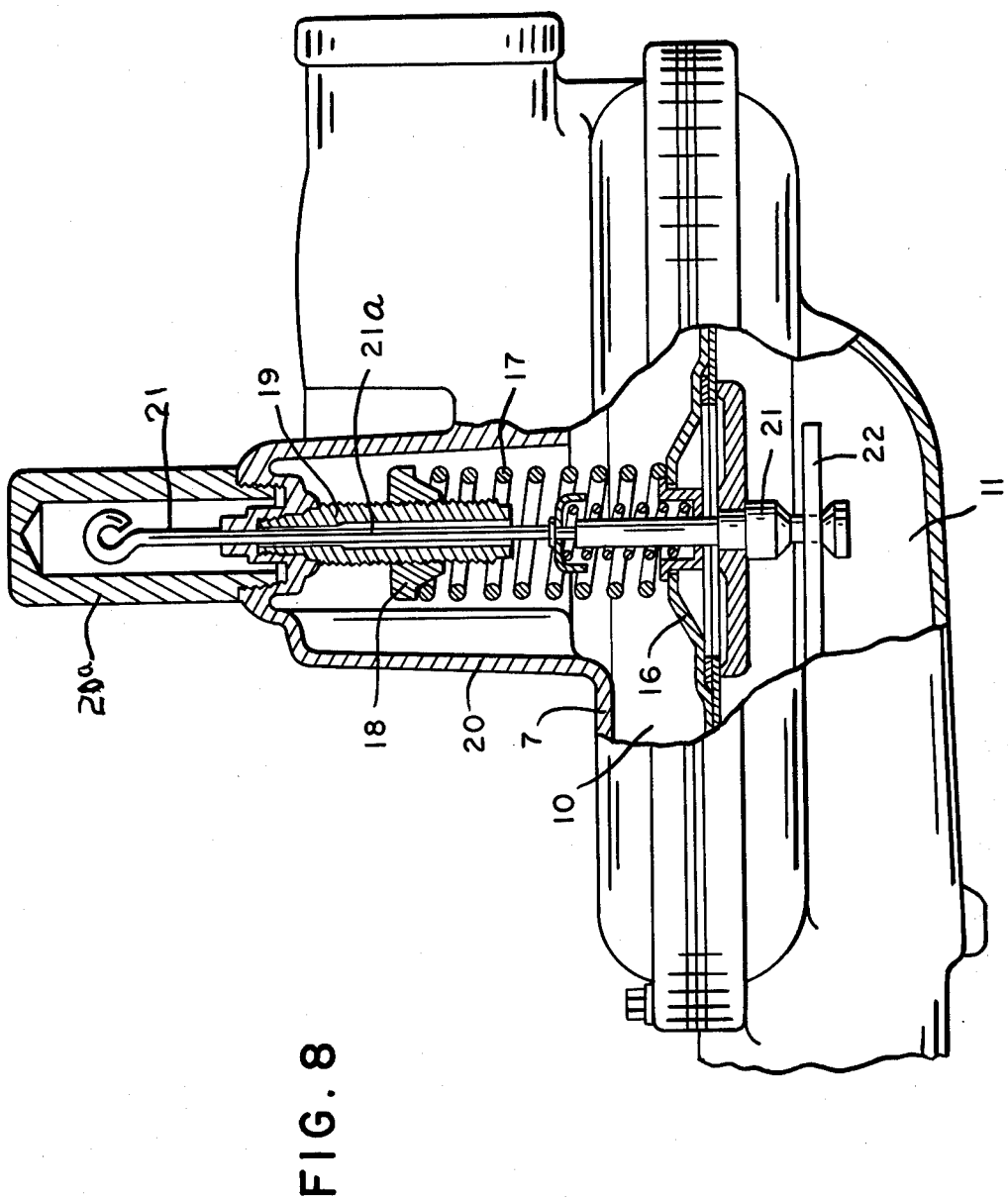
FIG. 8 is a side elevation of part of the diaphragm casing, portions being broken away to show manually operable means for resetting the diaphragm after a low pressure shutoff operation.

When the regulator is locked up by the excessively low pressure shutoff means above described and after it is determined that the gas appliances served by the regulator have been shut off, the regulator may be restored to normal operating condition as shown in FIG. 8 by removing a cap 20a screwed into the housing 20 and covering the adjusting nut 18 and screw 19 for adjusting the regulator spring 17 and manually pulling up on the upper end of a rod 21a connected to operating means 21 to raise the disphragm and cause the bellcrank 23 to push the valve stem 25 and main valve 27 and hence the pin 45 and shutoff valve 39 to the left, as shown in FIG. 1, away from the upstream valve seat 41 which allows the gas to enter the chamber 11 and restore the diaphragm to its operating position.

Figure 7:
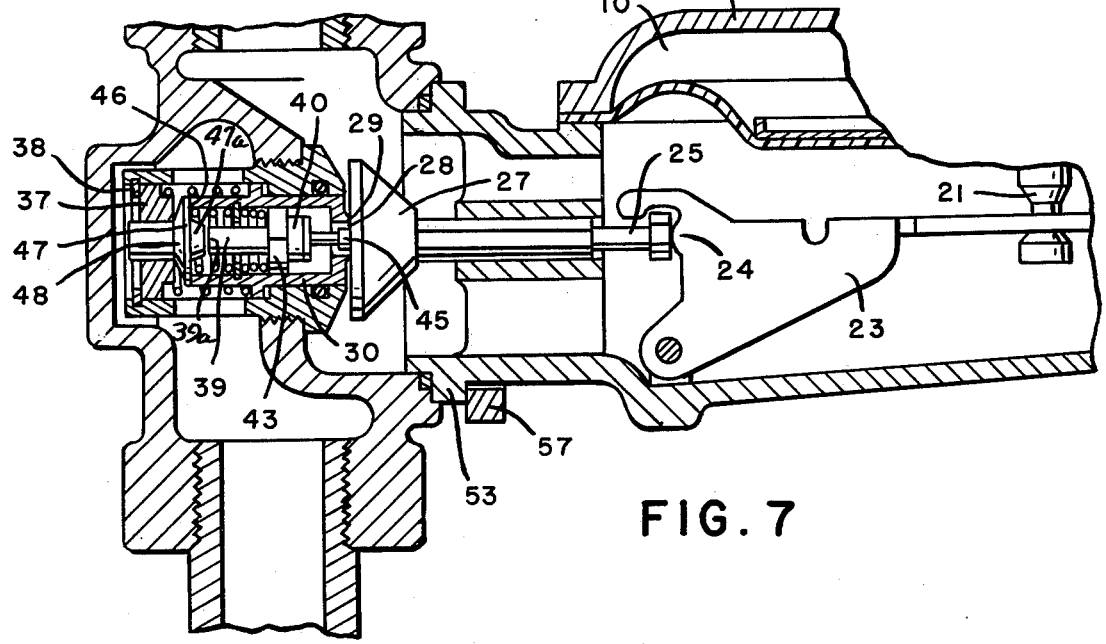
FIG. 7 is a view like FIG. 4 showing the upstream shutoff valve being seated as a result of excessive high pressure building up in the diaphragm casing.

When for any cause, for instance, if a piece 29a of foreign matter becomes lodged in the valve seat 29, as shown in FIG. 2, the pressure of the gas in the chamber 11 under the diaphragm 9 rises above a predetermined limit, for instance to the position shown in FIG. 7, the bellcrank 23 will cause the main valve 27 to engage valve seat 29 of orifice sleeve 30 and move the latter to the left, as viewed in FIG. 7, against the force of spring 35 until an upstream valve seat 46 on the orifice sleeve contacts a shutoff valve 47 on a shutoff valve body 48 slidably mounted in the plug 37 in the open end portion of the bushing 31. This stops the gas from flowing into the orifice sleeve 31 and hence into the regulator.

Figure 5:
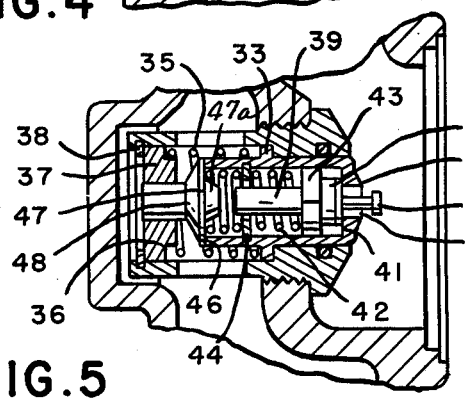
FIG. 5 is a fragmentary view of a portion of the valve housing after the diaphragm casing has been removed and shows the movable parts of the valves in the positions they occupy under excessively high pressure conditions with the shutoff valve closed.

When the cause of the excess gas pressure has been eliminated, the pressure of the gas under the diaphragm decreases and this causes the main valve 27 to recede under the force of the spring 17 to the position shown in FIG. 1, in which the low pressure shutoff valve 40 approaches the valve seat 41. However, due to the pressure of the gas on the high pressure shutoff valve body 48, the high pressure valve 47 remains in engagement with the upstream valve seat 46 on the orifice sleeve 30 and the regulator remains locked up, as shown in FIG. 5.

After the cause of the high pressure is determined and obviated, the regulator may be unlocked and the parts restored to operative position by manually unseating the high pressure shutoff valve 47 by means which is intentionally made inaccessible by enclosing all the valve parts within the regulator body and making provision to gain such access only with the use of tools usually not accessible to inexperienced persons.

This is accomplished, according to the embodiment of my invention disclosed herein, by making the valve housing and the diaphragm housing separable, preferably by providing for the removal of the diaphragm housing from the valve housing 12 which is installed in the conduits leading to the outlet orifice 13 and inlet orifice 14.

Figure 6:
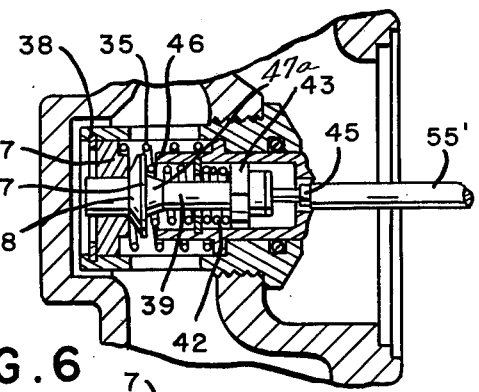
FIG. 6 is like FIG. 5 but shows a tool in the position it occupies when the shutoff valves have been unseated.

After the diaphragm casing 8 is removed from the valve housing, the end of the pin 45 of the low pressure shutoff valve 40, as shown in FIG. 6, is engaged by a suitable tool 55' which is pushed inwardly on the pin 45 causing the end 39a of the shutoff valve body 39 to engage a raised center portion 47a of the shutoff valve body 48 and move the shutoff valve 47 away from the upstream valve seat 46 of the orifice sleeve. This allows gas to flow into the orifice sleeve 30.

When this takes place, the pressure on the head of pin 45 is removed and this allows the shutoff valve 40 to reengage the upstream orifice valve seat 41 under the force of the spring 42 and the pressure of the gas and stop the flow of gas through the orifice 28. This is an important feature of the form of my invention disclosed herein, since it permits the unlocking and locking of the regulator without the necessity of shutting off a valve in the line leading to the regulator.

It should also be noted that as shown in my copending application for patent Ser. No. 555,547, filed Mar. 5, 1975, now U.S. Pat. No. 3,971,410, the valve mechanism disclosed herein may be inserted in and removed from the dividing wall in the valve housing as a complete assembled unit screw threaded in the opening in the dividing wall before the diaphragm casing is attached to the valve housing, or after it is removed.

All of the parts of the valve mechanism can be inserted in the orifice sleeve 30 through the open end thereof and are confined therein by the end plug 37 and the snap ring 38.

For the purpose of facilitating the removal of the disphragm housing 7, as shown in FIGS. 1 and 3, the valve housing 12 is provided with a socket 50 to removably receive the cylindrical end 51 on the throat 52 of the diaphragm housing 8 with a flange 53 on the latter engaging a seat 54 on the valve housing 12.

To removably hold the throat 52 in the socket 50, the valve housing 12 is provided with diametrically opposite ears 55, each of which has a screw threaded hole 56. A strap 57 which engages the outside of the flange portion 53 is secured to the ears by screws 58 as shown in FIG. 3. To remove the diaphragm casing from the valve housing it is necessary to use a suitable wrench to loosen the screws and remove at least one of them. Besides requiring the use of a tool to reach the pin, it is unlikely that an uniformed person would remove the diaphragm casing to unlock the regulator.

Variations and modifications may be made within the scope of the claims and portions of the improvements may be used without others.

I claim:

1. A gas pressure regulator comprisng a valve housing having an inlet means, outlet means and a wall separating said inlet means and said outlet means; a diaphragm casing; means for removably securing said diaphragm casing to said valve housing, said diaphragm casing having a gas chamber communicating with said outlet means and an air chamber leading to the atmosphere; a diaphragm mounted in said diaphragm casing; a bushing mounted in said wall of said valve housing; an orifice sleeve slidably mounted in said bushing and extending between and communicating with said inlet means and said outlet means, said orifice sleeve having a terminal upstream valve seat and an orifice having a downstream valve seat; resilient means in said bushing yieldingly retaining said orifice sleeve in normal position; a main valve; means operated by said diaphragm for moving said main valve toward and from said downstream valve seat of the orifice to regulate the flow of gas to said gas chamber and outlet means; means including a valve body slidably mounted in said bushing and having a high pressure shutoff valve positioned to be engaged by said terminal upstream valve seat on said orifice sleeve to shut off the flow of gas to and through said orifice sleeve to said gas chamber and outlet means when the pressure of the gas in the gas chamber rises above a predetermined acceptable pressure, said high pressure shutoff valve being caused by the pressure of the gas in said inlet means to remain in engagement with said terminal upstream valve seat and keep the flow of gas shut off when said orifice sleeve returns to normal position upon the pressure of the gas in the regulator becoming acceptable; and means in the orifice sleeve positioned to engage said shutoff valve including means extending through the downstream orifice of said orifice sleeve and accessible for manual engagement and operation when said diaphragm casing is removed from said valve housing for separating said high pressure shutoff valve from said upstream valve seat on said orifice sleeve to restore the flow of gas therethrough.

2. A gas pressure regulator according to claim 1 in which said bushing, said orifice sleeve, valve body and shutoff valve constitutes a unit insertable in and removable from said wall as a unit.

3. A gas pressure regulator according to claim 1 in which said orifice has an upstream valve seat; and said means in said orifice sleeve comprises a springurged valve body slidably mounted in said orifice sleeve and controlled by said diaphragm and having a valve for engaging said upstream valve seat for stopping the flow of gas therethrough when the pressure of the gas in the gas chamber falls below a predetermined pressure; and manually operated mechanical means for moving said low pressure shutoff valve off said upstream valve seat of the orifice to cause the flow of gas to the gas chamber to be resumed.

4. A gas pressure regulator according to claim 1 in which said orifice of the orifice sleeve has an upstream valve seat and said means extending through said orifice sleeve carries a low pressure shutoff valve positioned to engage said upstream valve seat of said orifice and be engaged by said main valve to be moved thereby to and from said orifice to control the flow of gas through the orifice sleeve; and resilient means in said orifice sleeve engaging said low pressure shutoff valve and biased to cause said low pressure shutoff valve therein to move to position to engage said upstream valve seat of said orifice when the main valve recedes therefrom upon the pressure of the gas in the diaphragm dropping below a predetermined valve or upon the removal of the diaphragm casing from the valve housing.

5. A gas pressure regulator according to claim 1 in which said means in the orifice sleeve comprises a valve body having a downstream valve thereon and said resilient means causes the valve body to move the downstream valve thereon against said upstream orifice valve seat to stop the flow of gas through the orifice when the diaphragm casing is removed from the valve housing.

* * * * *